US012064999B2

(12) United States Patent
Decoster et al.

(10) Patent No.: US 12,064,999 B2
(45) Date of Patent: Aug. 20, 2024

(54) TIRE WITH MAGNETIC TREAD WEAR SENSOR AND TREAD WEAR MONITORING METHOD

(71) Applicant: The Goodyear Tire & Rubber Company, Akron, OH (US)

(72) Inventors: Yves Francois Claude Decoster, Ethe (BE); Pierre Felix Orlewski, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/659,191

(22) Filed: Apr. 14, 2022

(65) Prior Publication Data
US 2022/0397486 A1 Dec. 15, 2022

Related U.S. Application Data

(60) Provisional application No. 63/208,573, filed on Jun. 9, 2021.

(51) Int. Cl.
*B60C 11/24* (2006.01)
*G01B 7/06* (2006.01)
(Continued)

(52) U.S. Cl.
CPC .......... *B60C 11/246* (2013.01); *B60C 11/243* (2013.01); *G01B 7/10* (2013.01);
(Continued)

(58) Field of Classification Search
CPC ................ B60C 11/243; B60C 11/246; B60C 2019/004; B60C 2019/005; G01B 7/10; G01D 5/145; G01M 17/02
See application file for complete search history.

(56) References Cited

U.S. PATENT DOCUMENTS 3,675,375 A * 7/1972 Enabnit ............... B29B 17/0206
451/28
7,762,129 B2 7/2010 Niklas et al.
(Continued)

FOREIGN PATENT DOCUMENTS

CN 108081877 A 5/2018
CN 108528149 A 9/2018
(Continued)

OTHER PUBLICATIONS

European Search Report for Serial No. EP22177641 dated Oct. 11, 2022.

Primary Examiner — Jill E Culler
(74) Attorney, Agent, or Firm — Edward T. Kennedy

(57) ABSTRACT

This invention relates to tire tread wear monitoring. A sacrificial magnet portion is arranged in a tread of the tire so that it undergoes wear along with the tread and generates a useful magnetic field signal indicative of remaining tread thickness. With a magnetic field sensor arranged on or in the tire, an overall magnetic field signal is measured, which includes the useful magnetic field signal, and a superimposed interfering magnetic field signal generated by magnetizable material contained in the tire. A non-sacrificial magnet portion is used to saturate the magnetizable material at least locally so as to make the interfering magnetic field signal sensed by the magnetic field sensor substantially independent of the useful magnetic field signal sensed by the magnetic field sensor. Further aspects of the invention relate to tires, e.g., vehicle tires, featuring a tire tread wear monitoring system.

18 Claims, 5 Drawing Sheets

(51) Int. Cl.
*G01D 5/14* (2006.01)
*G01M 17/02* (2006.01)
*B60C 19/00* (2006.01)

(52) U.S. Cl.
CPC ............ *G01D 5/145* (2013.01); *G01M 17/02* (2013.01); *B60C 2019/004* (2013.01); *B60C 2019/005* (2013.01)

(56) References Cited

U.S. PATENT DOCUMENTS

| | | | |
|---|---|---|---|
| 10,789,773 | B2 | 9/2020 | Zoken et al. |
| 10,876,826 | B2 * | 12/2020 | Ledoux .................... G01B 7/26 |
| 2006/0042734 | A1 | 3/2006 | Turner et al. |
| 2009/0078347 | A1 | 3/2009 | Niklas et al. |
| 2016/0153763 | A1 | 6/2016 | Ledoux |
| 2016/0169657 | A1 * | 6/2016 | Ledoux ................. G01M 17/02 73/146 |
| 2017/0349007 | A1 | 12/2017 | Wei |
| 2019/0180505 | A1 | 6/2019 | Zoken et al. |
| 2019/0359010 | A1 * | 11/2019 | Setokawa ............. B60C 11/243 |
| 2021/0170804 | A1 | 6/2021 | Tanno |
| 2022/0332149 | A1 * | 10/2022 | Setokawa ............. G01M 17/02 |

FOREIGN PATENT DOCUMENTS

| | | |
|---|---|---|
| CN | 108583165 A | 9/2018 |
| CN | 110525132 A | 12/2019 |
| CN | 111315595 A | 6/2020 |
| CN | 111919038 A | 11/2020 |
| DE | 102015207381 A1 | 10/2016 |
| EP | 3910281 A1 | 11/2021 |
| EP | 4033200 A1 | 7/2022 |
| JP | 2021017156 A | 2/2021 |
| JP | 2021017158 A | 2/2021 |
| KR | 102104724 B1 | 4/2020 |
| WO | 2020154145 A1 | 7/2020 |

* cited by examiner

TIRE WITH MAGNETIC TREAD WEAR SENSOR AND TREAD WEAR MONITORING METHOD

BACKGROUND OF THE INVENTION

The invention generally relates to a tire with a magnetic tread wear sensor and a tread wear monitoring method.

The tires of a vehicle provide the only contact between the vehicle and the road. Worn tires lead to poor contact, reduced grip, increased braking distance, and less water-shifting power. For safety reasons, most states define a minimum tread depth for road vehicles. Tires are provided with tread wear indicators, narrow elevations across grooves in the tread pattern, which allow checking compliance with the legal requirements by visual and haptic inspection. When the tread is level with the tread wear indicators, the tire must be changed.

Visual inspection of vehicle tires is unsatisfactory since many drivers do not carry it out regularly or even do not know how to do so. Furthermore, the method is only a pass/fail check and does not include a measurement of the tread depth above the legal limit. Visual inspection is not adequate for estimating the remaining lifetime or mileage of the tire for the purpose of maintenance prediction, fleet management, and the like.

Mileage measurement has been used for estimating tread wear, remaining tire lifetime and remaining mileage. This method is imprecise because tread wear depends on other factors than just mileage, e.g., road conditions, weather conditions, driving style (accelerations, braking, speed), tire temperature, etc.

More recently, it has been proposed to measure tread wear with a magnet embedded in the tread and undergoing wear together with the tread and a magnetometer. As the embedded magnet erodes, the strength of its magnetic field, sensed by the magnetometer, decreases. The sensed magnetic field strength thus indicates the remaining tread depth.

EP3632667A1 discloses a method of manufacturing a pneumatic tire provided with a magnetic portion containing hard magnetic powder particles in the tread portion. The method comprises a step of drilling a hole in an unvulcanized tread portion forming member; a step of embedding a magnetic piece containing the hard magnetic powder particles in the hole as the magnetic portion; a step of molding a green tire using the tread portion forming member in which the magnetic piece is embedded; and a step of vulcanizing the green tire. The method aims at finishing the tire without causing occurrence of abnormal unevenness on the surface, even when a magnetic piece for detecting a worn state of the tire is embedded.

EP3335912A2 discloses tire embodiments that use packages containing magnetic particles. As the tread wears due to use, magnetic particles erode from the tire, and the strength of the magnetic field emitted from the package decreases. The magnetic field is monitored with a magnetometer, which is placed against the surface of the tread. In an alternative embodiment, the tire is driven over a surface that contains a magnetometer. In another alternative embodiment, the magnetometer is mounted on a car, e.g., in a wheel well.

US2009078347A1 discloses a tire tread sensing system that includes a magnetic field sensor and a magnetic field source configured to magnetize magnetizable particles embedded in a tire tread. The magnetic field sensor is configured to measure a magnetic field strength associated with the magnetic field source and the magnetizable particles, and the magnetic field strength is indicative of a tire tread depth. Alternatively, the particles comprise alternating permanent magnets embedded in a tread portion of a tire.

WO2019107296A1 relates to a tire wear information acquisition system and corresponding method. A tread part of a pneumatic tire is provided with: a columnar wear measurement magnet which wears down along with the tread rubber, and thereby decreases in magnetic flux density or magnetic field intensity; and a columnar reference magnet positioned such that the reference magnet does not wear down along with the tread rubber. The wear measurement magnet and the reference magnet extend from a position next to a tread surface, at which the tread part contacts the ground, toward a tire cavity region of the pneumatic tire, and the end of the reference magnet on the tread surface side thereof is positioned farther from the thread surface than is the end of the wear measurement magnet on the tread surface side thereof.

EP3572246A1 discloses a tire wear measuring system. A pneumatic tire comprises a magnetic body provided in a tread portion, a magnetic sensor for detecting a magnetic flux density of a magnetic field formed by the magnetic body disposed at a radially inward position corresponding to the magnetic body. The magnetic body is formed by dispersing powdery particles of a hard magnetic material in a polymeric material and is magnetized in one direction. The magnetic body is provided in the tread portion so that the magnetization direction and the tire radial direction coincide with each other.

DE102015207381A1 discloses a system and method for measuring tread thickness. At least portions of a tire tread are prepared with magnetic material. A magnetic sensor arranged in the tire detects a change of the magnetic properties of the tread, whereby a residual tread thickness or a deformation of a tread block can be determined.

With existing magnetic tire wear measurement systems, reliability and signal robustness may be an issue. Many tires include steel components (e.g. steel belts or cords), the magnetization of which may change unpredictably over tire lifetime (e.g., due to stress, temperature gradients, exposure to an external magnetic field, etc.). The magnetic field of the steel components unpredictably contributes to the magnetic field sensed by the magnetometer in such a way that the magnetic field originating from the magnet being eroded cannot be determined. In one of its aspects, the present invention aims at addressing that issue.

SUMMARY OF THE INVENTION

According to a first aspect of the invention, a tire comprises: a tread, the tread having arranged therein a sacrificial magnet portion exposed to tread wear, the sacrificial magnet portion generating a useful magnetic field signal varying as a function of tread wear, magnetizable material having a magnetization depending non-linearly on magnetic field strength, the magnetizable material generating an interfering magnetic field signal superimposing the useful magnetic field signal;

a magnetic field sensor for measuring the useful magnetic field signal and the superimposed interfering magnetic field signal; and a permanent (and non-sacrificial) magnet portion arranged proximate the magnetizable material so as to decouple the interfering magnetic field signal sensed by the magnetic field sensor from the useful magnetic field signal sensed by the magnetic field sensor by substantially saturating the magnetizable material.

The permanent magnet portion is arranged within the tire in such a way that it is protected against wear. The permanent magnet portion is configured to have (e.g. thanks to its dimensions and to the magnetic material) a magnetic moment which leads to substantial saturation of the magnetizable material.

According to an embodiment, the sacrificial magnet portion and the permanent magnet portion are integrated within a stud embedded in the tread. The tread could comprise a recess that is shaped complementarily to the stud so as to secure the stud in position and relative orientation. The sacrificial magnet portion and the permanent magnet portion could be part of the same magnet. In this case, the boundary between these portions is taken to coincide with the minimum authorized tread level, as the part of the magnet that is radially inward from this level is deemed to be non-sacrificial. Preferably, however, the sacrificial magnet portion and the permanent magnet portion are comprised of distinct magnets.

The sacrificial magnet portion may comprise a plug (e.g. an elastomer or rubber plug or another soft and elastic polymer-material plug) with magnetic particles dispersed therein. The dispersion of the magnetic particles may be substantially homogeneous or, alternatively, have one or more concentration gradients.

According to an embodiment, the sacrificial magnet portion comprises plural discrete magnetic inserts arranged radially aligned at different depths in the tread. With such configuration, the useful magnetic field signal may present phases of higher variation (when the discrete magnetic insert that is radially outermost at the respective time is being eroded) interleaved with phases of lower variation (when the discrete magnetic insert that is radially outermost at the respective time is still protected by a rubber layer).

According to an embodiment, the magnetizable material is part of a breaker or a belt of the tire. It should be noted, however, that magnetisable material could also be present in other components of the tire, e.g., in the tire carcass. As used herein, "carcass" designates the structural framework of a pneumatic tire. The tire carcass typically includes several layers, or plies, of tire cord.

According to an embodiment, the tire includes a controller operatively connected to the magnetic field sensor, the controller configured to receive the useful magnetic field signal and to derive from the useful magnetic field signal an indicator of at least one of tread profile depth, tread wear and estimated remaining tread lifetime.

According to an embodiment, the sacrificial magnet portion, the permanent magnet portion and the magnetic field sensor are radially aligned on the tire.

According to an embodiment, the magnetic moment (more precisely: the magnetic dipole moment) of the sacrificial magnet portion and the magnetic moment of the permanent magnet portion are collinear, "collinear" meaning herein "parallel and pointing in the same direction".

According to an embodiment, the magnetic moment of the sacrificial magnet portion and the magnetic moment of the permanent magnet portion are perpendicular.

The magnetic field sensor could include a magnetometer, preferably at least one of: a single-axis Hall sensor, a multi-axis Hall sensor, a magnetoresistive-effect-based magnetometer, a magnetostrictive-effect-based magnetometer and a Lorentz-force-based MEMS magnetometer.

According to an embodiment, the magnetic field sensor comprises a three-axis magnetometer.

In a further aspect, the invention relates to a vehicle tire, comprising:
  a tread, the tread including raised areas and grooves,
  a sacrificial magnet portion including one or more magnetic inserts arranged in a raised area of the tread so as to undergo wear along with the tread, the one or more magnetic inserts generating a useful magnetic field signal indicative of tread thickness,
  a carcass defining a tire interior;
  a breaker or a belt arranged between the tread and the carcass, the breaker or belt including saturable magnetizable material,
  a magnetic field sensor arranged in the tire interior for measuring an overall magnetic signal comprising the useful magnetic field signal and a superimposed interfering magnetic field signal generated by the magnetizable material of the breaker or belt; and
  a non-sacrificial magnet portion including a permanent magnet magnetically saturating the magnetizable material at least locally so as to make the interfering magnetic field signal sensed by the magnetic field sensor substantially independent of the useful magnetic field signal sensed by the magnetic field sensor.

A breaker is a typically steel-reinforced cord layer placed in-between the tread and carcass in a bias tire to protect the carcass. A belt is a strong reinforcement layer, e.g. comprising steel reinforcement, located between the tread and the carcass in radial and belt tires.

According to an embodiment, the one or more magnetic inserts, the magnetic field sensor and the permanent magnet are radially aligned. The magnetic moment of the one or more magnetic inserts and the magnetic moment of the permanent magnet may have any suitable relative orientation. Preferably, however, the magnetic moment of the one or more magnetic inserts and the magnetic moment of the permanent magnet are collinear or perpendicular.

According to an embodiment, the vehicle tire comprises a controller operatively connected to the magnetic field sensor, the controller configured to receive the useful magnetic field signal and to communicate information derived from the useful magnetic field to an on-board diagnostics system of the vehicle.

In yet a further aspect, the invention relates to a tire tread wear monitoring method, comprising:
  generating, with a sacrificial magnet portion including one or more magnetic inserts arranged in a tread of the tire so that they undergo wear along with the tread, a useful magnetic field signal indicative of remaining tread thickness,
  measuring, with a magnetic field sensor arranged on or in the tire, an overall magnetic field signal including the useful magnetic field signal and a superimposed interfering magnetic field signal generated by magnetizable material contained in the tire,
  saturating, with a non-sacrificial magnet portion, the magnetizable material at least locally so as to make the interfering magnetic field signal sensed by the magnetic field sensor substantially independent of the useful magnetic field signal sensed by the magnetic field sensor.

According to an embodiment, the method comprises processing the overall magnetic field signal, the processing including deriving at least one of tread profile depth, tread wear and estimated remaining tread lifetime from the overall magnetic field signal.

According to an embodiment, the method comprises issuing a warning when the at least one of tread profile depth, tread wear and estimated remaining tread lifetime reaches a threshold.

According to an embodiment, the method comprises, combining the at least one of tread profile depth, tread wear and estimated remaining tread lifetime with TPMS information in a digital tire state information message or report.

As will be appreciated by the skilled person, embodiments presented herein may be freely combined with one another without departing from the spirit and scope of the invention, except when it follows from context that such combination would make no sense.

The term "useful magnetic field" is used herein to designate the magnetic field of the sacrificial magnet portion exposed to tread wear to allow distinction from other magnetic fields, e.g., the magnetic field generated by the magnetizable material and the overall magnetic field sensed by the magnetic field sensor. The magnetic field generated by the sacrificial magnet portion may be regarded as useful in the sense that it depends on tread wear but no other magnetic field properties are intended by the use of the word "useful". The term "interfering magnetic field" has been chosen to designate the magnetic field generated by the magnetizable material to allow distinction from other magnetic fields, e.g., the magnetic field generated by the one or more magnetic inserts.

The expression "permanent magnet" designates a magnet made from magnetically hard material, i.e. magnetic material that cannot easily be demagnetized and thus retains its magnetism in conditions of normal use of the tire. It should be noted that the permanent magnet need not saturate the magnetizable material all over the tire. It is indeed sufficient if the non-sacrificial permanent magnet portion saturates the magnetizable material locally so that the interfering magnetic field signal sensed by the magnetic field sensor stays substantially constant. Thanks to the permanent magnet, the interfering magnetic field signal sensed by the magnetic field sensor can be treated as a constant offset (the value of which may be determined by calibration), which can be subtracted from the overall magnetic signal sensed by the magnetic field sensor or otherwise be withdrawn from consideration.

It should be understood that the tire could be a vehicle tire, e.g., a pneumatic tire or an airless tire (also known as "non-pneumatic" or "flat-free" tire).

The sacrificial magnet portion is "sacrificial" in the sense that, because it is exposed to tread wear, it is abraded together with the tread over tire lifetime and thus "sacrificed".

In the present document, the verb "to comprise" and the expression "to be comprised of" are used as open transitional phrases meaning "to include" or "to consist at least of". Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context).

BRIEF DESCRIPTION OF THE DRAWINGS

By way of example, preferred, non-limiting embodiments of the invention will now be described in detail with reference to the accompanying drawings, in which.

DETAILED DESCRIPTION OF PREFERRED EMBODIMENTS

Figure 1:
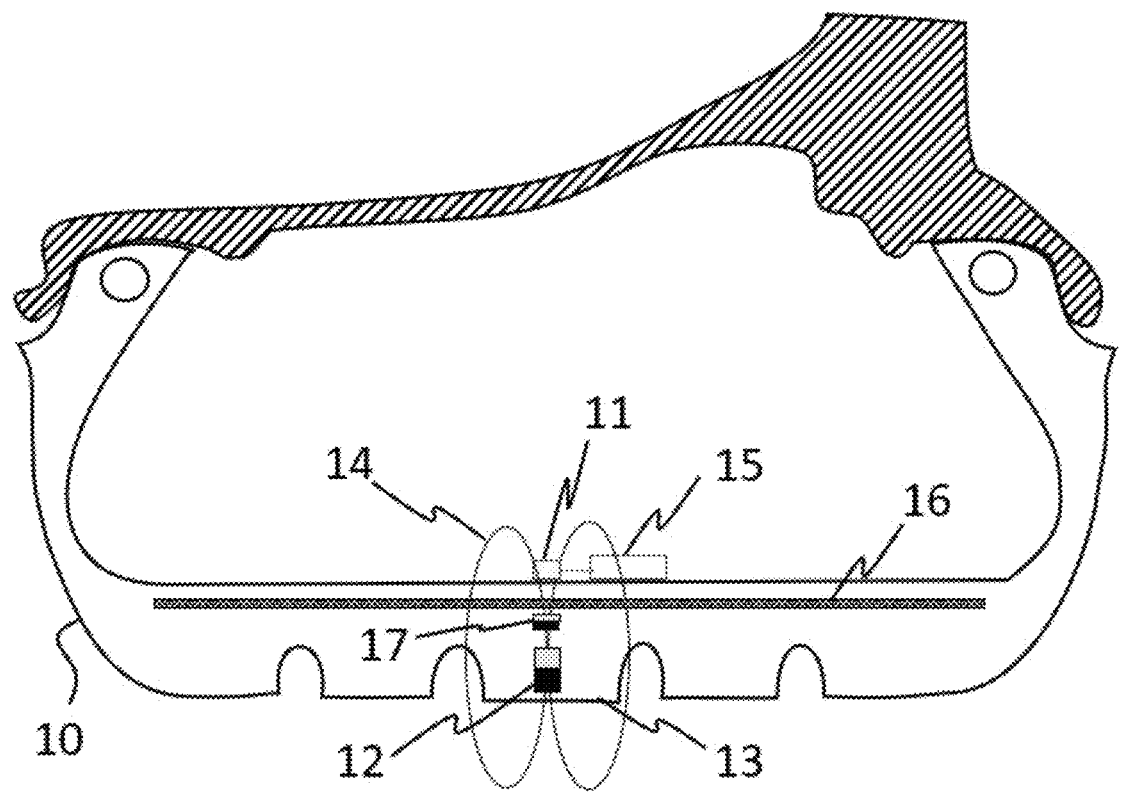
FIG. 1 is a cross-sectional schematic view of a vehicle tire equipped with a tire tread wear monitoring system according to an embodiment of the invention.

The apparatuses and methods herein disclosed may use a distributed, magnetic sensing system capable of providing current tire tread depth or another indicator of tire wear. In preferred embodiments, this distributed system comprises one or more magnetic inserts installed in a raised area of the tread (e.g. in a tread block or rib) and undergoing wear along with tread rubber around and a magnetometer installed inside the tire (bonded to inner liner), radially aligned with the one or more magnetic inserts. The magnetometer measures the magnetic field. The long-term variation of the magnetic field is attributed to the erosion of the one or more magnetic inserts due to tread wear. A key challenge is to provide a stable and robust magnetic measurement, in particular in the presence of magnetizable material (e.g. one or more layers of steel breakers or belts in the tire carcass).

The magnetization of the magnetizable material, such as that of the breakers or belts, depends on the external magnetic field but not only. Changes of the magnetization and thus of the magnetic field sensed by the magnetometer may also result from chocks, material stress, temperature variations and environmental magnetic fields, which cannot be avoided on a rolling tire. Magnetic field variations (including long-term variations) sensed by the magnetometer cannot, therefore, be readily attributed to wear of the one or more magnetic inserts. In other words, the variations occasioned by magnetization changes potentially mask the variations that are due to tread wear. Consequently, tread wear cannot be determined with a sufficient level of certainty unless remedial action is taken. Carcass demagnetization did not show satisfactory results because as deformation and flexion of the tire during its lifetime made magnetization reappear quasi-randomly.

According to aspects of the invention, a permanent magnet (also referred to as "saturating magnet") is arranged in the tire in such a way as to substantially saturate the magnetization of the magnetizable material. In the saturation region, the magnetization becomes essentially independent of variations of the external magnetic field. Furthermore, since the permanent magnet strongly biases the magnetizable material, other external parameters (e.g., chocks, material stress, temperature variations) will have only reduced influence on the magnetization. Therefore, the interfering magnetic field will be essentially constant and can be subtracted or otherwise be compensated for in the measurement.

According to an aspect of the invention, the signal-to-noise ratio of the measurement of the magnetic field generated by the one or more magnetic inserts (permanent magnet(s) in the tread of the tire—hereinafter also referred to as "tread magnet" for simplicity). The tread magnet can be used to monitor the compression and shear forces in a tread block or rib (in this case, the tread magnet works as a joystick) or to monitor the tread depth or the tire wear state as the tread magnet would be abraded as the tire tread (wear sensor).

An embodiment of the invention is illustrated in FIG. 1, which shows part of a tire 10, mounted on a wheel rim, in cross section. A tread magnet 12 is arranged in the tread 13 of the tire in such a way that it erodes together with the tread. The magnetic moment of the tread magnet 12 is oriented radially, i.e. pointing or away from to the tire axis (not shown). A magnetometer 11 is arranged in the tire interior, e.g., on an inner liner. The magnetometer 11 senses the magnetic field 14 of the tread magnet 12 (together with any superimposed magnetic fields). A strong permanent magnet 17 ("saturating magnet") is arranged in the tire 10 so as not to be exposed to wear and very close to the breakers 16. Permanent magnet 17 is arranged on the axis of the tread magnet 12. The magnetic field strength of the saturating magnet is chosen such that it saturates the magnetization of the metallic breaker 16. The magnetometer 11 is connected to controller module 16, e.g. a TPMS (tire pressure monitoring system) module, which provides wireless communication with the vehicle's on-board diagnostic system.

Figure 2:
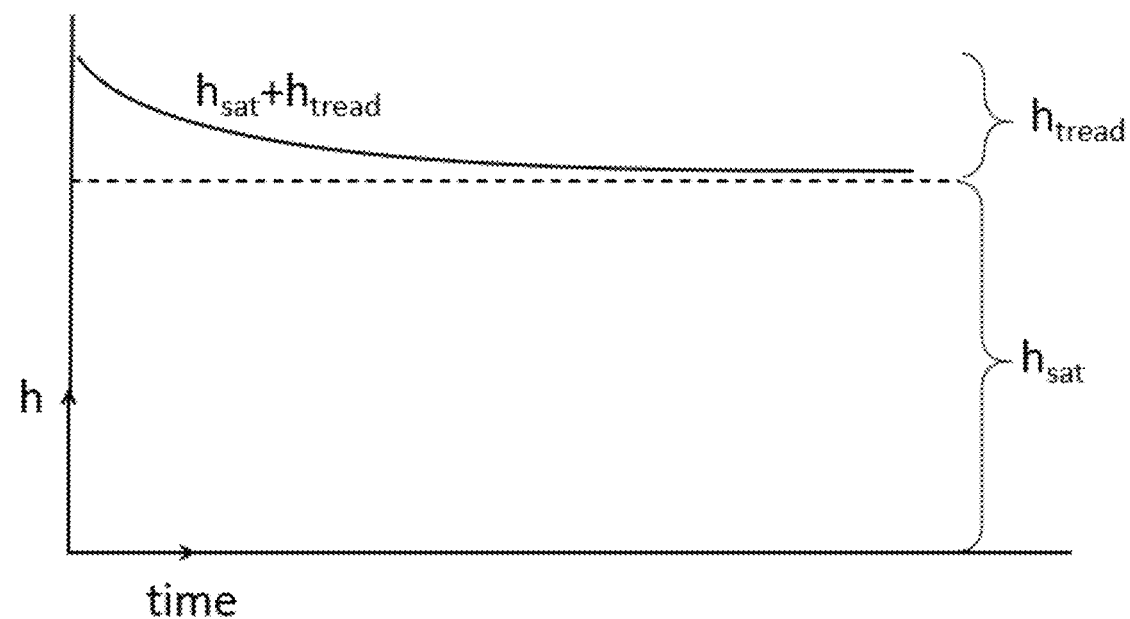
FIG. 2 is a simplified illustration of the evolution of a magnetic field signal at the magnetometer of a tire tread wear monitoring system according to an embodiment of the invention.

FIG. 2 schematically illustrates the long-term evolution of the magnetic field strength sensed by the magnetometer 11. The permanent magnet 17 biases the magnetic field generated by the breaker 16 to a stable value $h_{sat}$. The overall magnetic field signal measured by the magnetometer 11 is $h_{sat}+h_{tread}$, where $h_{tread}$ is the magnetic field generated by the tread magnet 12.

In the embodiment of FIG. 1, the magnetic moments of the saturating magnet and the tread magnet are collinear. The useful magnetic field signal $h_{tread}$ may be only a small part of the overall signal, which decreases over time as the tread magnet 12 is worn away (FIG. 2).

Figure 3:
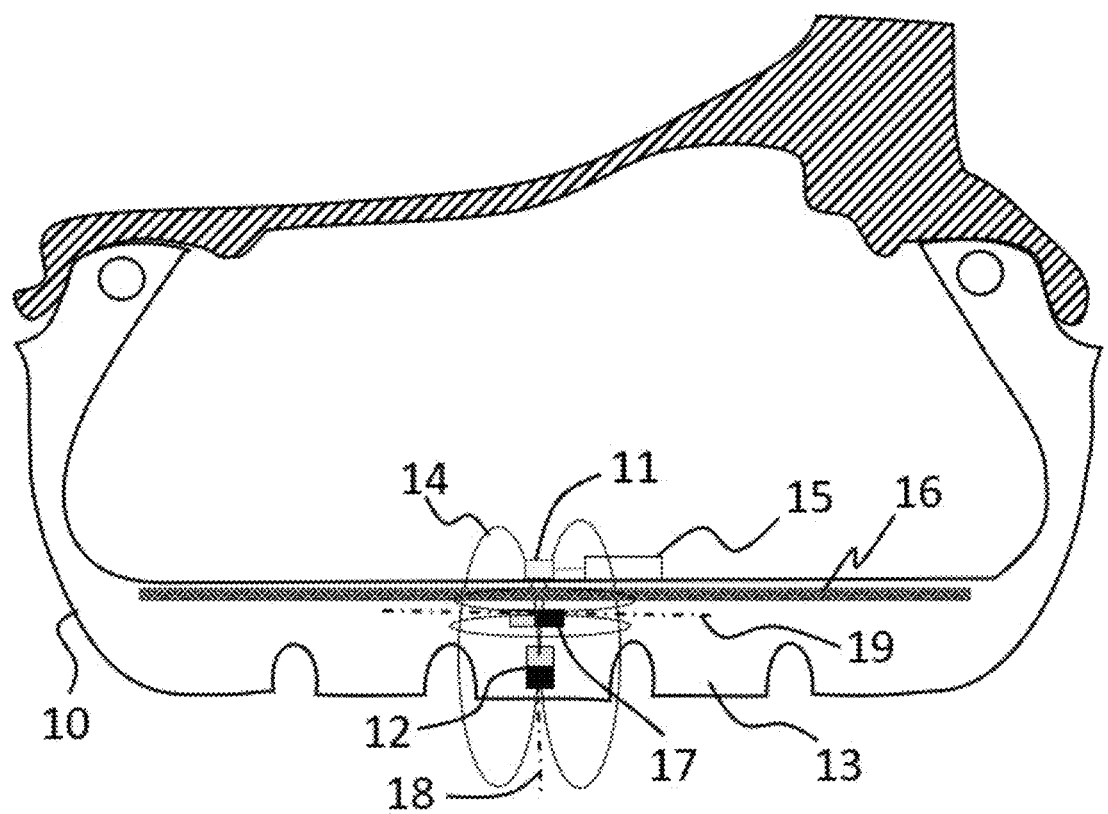
FIG. 3 is a cross-sectional schematic view of a vehicle tire equipped with a tire tread wear monitoring system according to a further embodiment of the invention.
Figure 4:
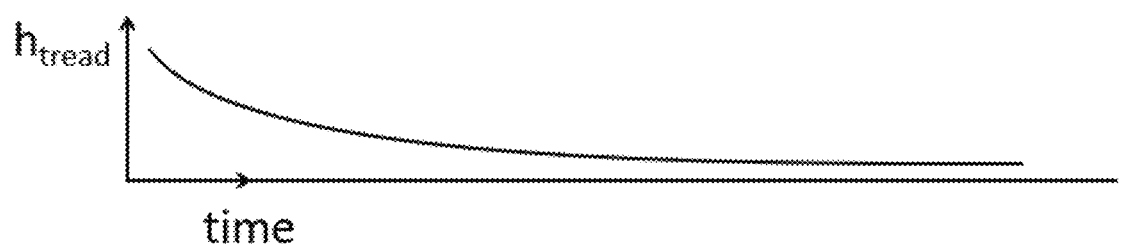
FIG. 4 is a simplified illustration of the evolution of the useful magnetic field signal over time.
Figure 5:
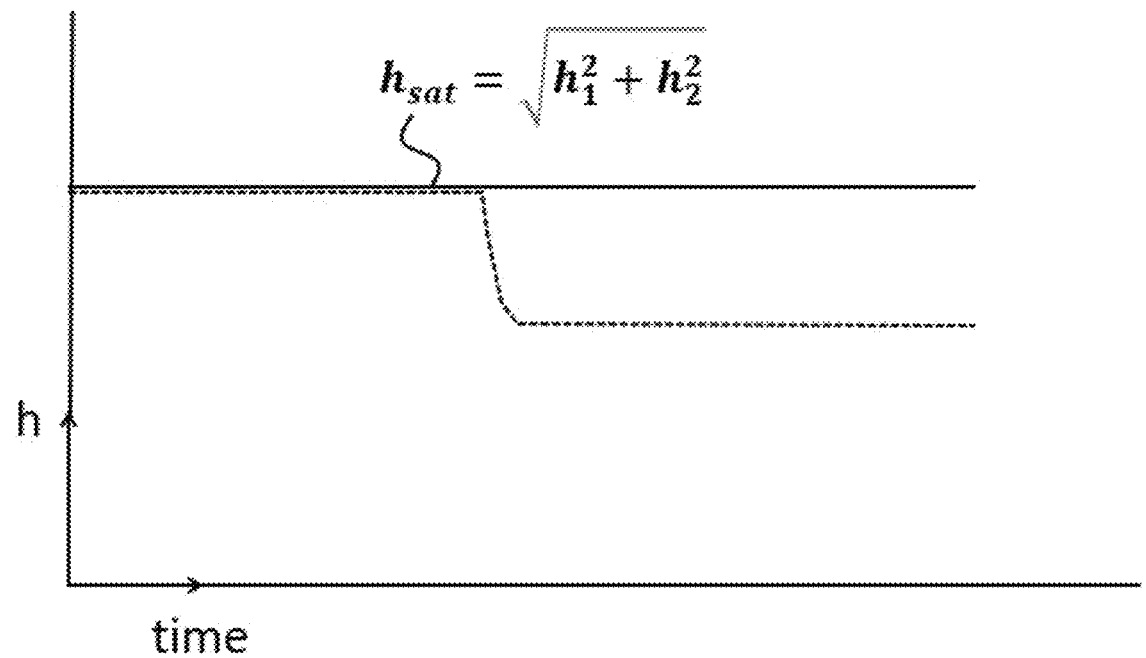
FIG. 5 is a simplified illustration of the evolution of the magnetic field signal caused by the saturating magnet and the magnetisable material, when the system operates normally (solid line) or when the saturating magnet fails (dotted line)

FIG. 3 illustrates an embodiment of the invention, wherein the saturation magnet 17 is arranged such that its magnetic moment is perpendicular to the magnetic moment of the tread magnet. In FIG. 3, the axis of the magnetic moment of the tread magnet 12 is shown at reference number 18 and the axis of the magnetic moment of the saturating magnet 17 is shown at reference number 19. In the illustrated configuration, the useful magnetic field $h_{tread}$ at the location of the magnetometer 11 is oriented essentially radially, whereas the interfering magnetic field $h_{sat}$ at the location of the magnetometer 11 is essentially perpendicular to the useful magnetic field. Consequently, the magnetometer 11 could be a single-axis device and oriented parallel to axis 11 of the tread magnet 12. A first advantage of this configuration is that the magnetic sensor only measures the useful magnetic signal (FIG. 4 reference number 13) without scarifying a significant part of its range for the magnetic field of the saturating magnet 17 and the breaker 16. A second advantage is that the saturating magnet 17 generates a magnetization in great part parallel to the breakers 16. This may potentially saturate the breakers 16 over a larger area, further increasing the stability of the measurement of $h_{tread}$. In this configuration, the use of a 3-axis magnetometer would allow a self-diagnostic function of the system: in addition to the useful magnetic signal $h_{tread}$ (measured on the sensor axis parallel to the polarity of the tread magnet), a signal $h_{sat}$ computed as the norm of the magnetic field strengths $h_1$ and $h_2$ along the two perpendicular axes could be used to detect the presence of the saturating magnet. In case of ejection of the saturating magnet 17 during the lifetime of the tire 10, the signal $h_{sat}$ would suddenly drop (FIG. 5, dashed line). The magnetometer or any controller connected thereto may be configured to detect such a drop and generate an alarm upon detection. A 2-axis magnetometer could also be used to allow the self-diagnostic function but, in this case, the axis of the sensor that monitors the presence of the saturating magnet should always be parallel to the polarity of this magnet and must remain in its original orientation over the lifetime of the tire. The use of a 3-axis sensor would alleviate the requirement of precise alignment of the saturating magnet with the sensor. Accordingly, the use of a 3-axis magnetometer may be preferred because it may allow easier installation in the tire.

The magnetometer 11 is preferably multi-axis and based on Hall effect for better accuracy and wider range measurement. However, the sensor could also be based on the magneto-resistive effect, the magneto-strictive effect or be a Lorentz-force-based MEMS sensor.

It may be worthwhile noting that a single saturating magnet could be used. Alternatively, plural saturating magnets separated by rubber compound could be arranged in the tire. The saturating magnets could be of same size and/or have substantially the same magnetic moment. Alternatively, saturating magnets of different size and/or magnetic moments could be used. The saturating magnets may be arranged so as to precisely shape the form of the magnetic field generated to saturate the magnetizable material in the tire, in particular any steel breakers or belts.

Figure 6:
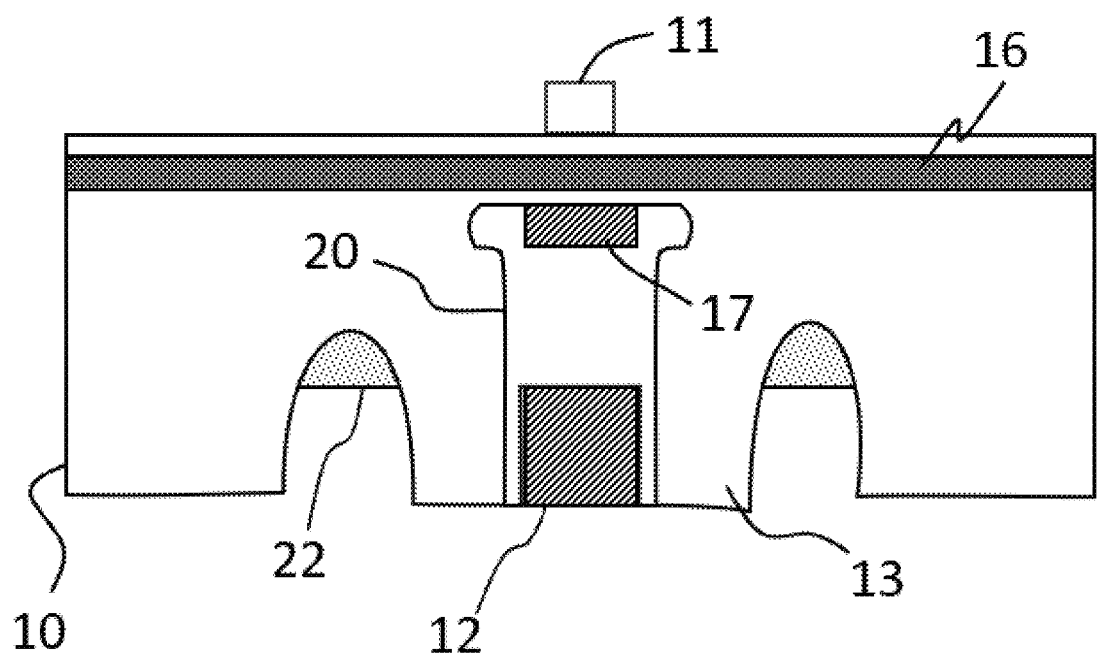
FIG. 6 is a partial cross-sectional schematic view of a vehicle tire equipped with a magnetic stud that comprises a sacrificial magnet portion and a non-sacrificial saturating magnet portion.
Figure 7A:
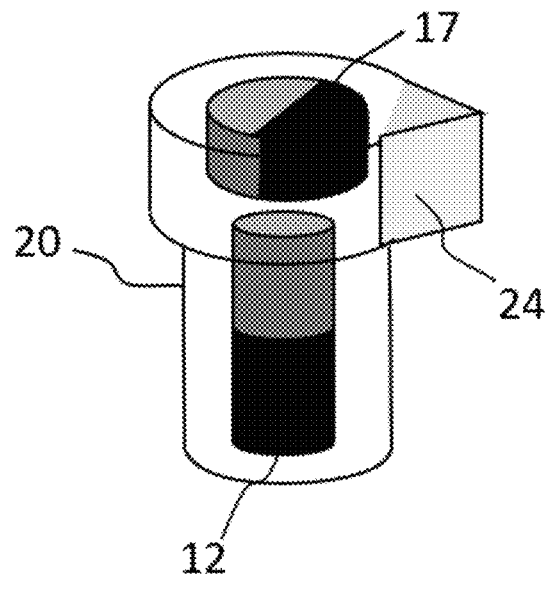
FIG. 7a is a schematic illustration of a first embodiment of a magnetic stud.
Figure 7B:
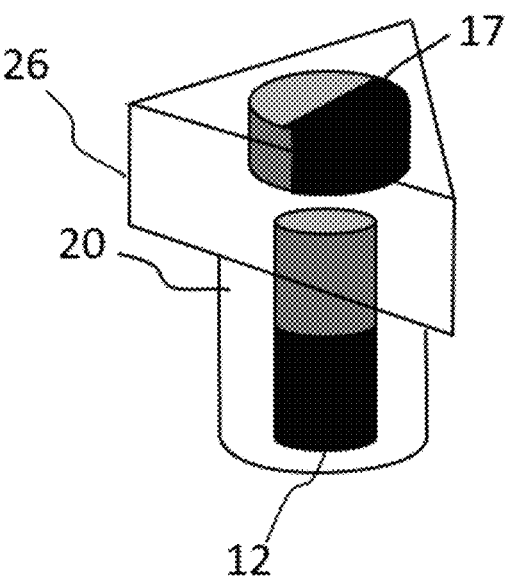
FIG. 7b is a schematic illustration of a second embodiment of a magnetic stud.

According to embodiments of the invention, illustrated in FIGS. 6 and 7, the tread magnet 12 and the saturating magnet 17 may be installed in a post-cured tire in order not to expose the magnets to the high temperatures that the tire undergoes during the curing process, which could affect their magnetic properties. The magnets 12, 17 are placed in a stud 20 (hereinafter also named: "magnetic stud"), which is arranged in a form-fitting recess or cavity provided in the tread 13.

The saturating magnet 17 is located at the radially inner end of the stud 20, the tread magnet 12 at the radially outer end. The stud 20 is roughly mushroom-shaped, its base being larger in diameter than its stem. The shape secures the stud 20 in a preformed, complementarily shaped cavity in the tire tread 13. The stud 20 guarantees a fix and stable position of the saturation magnet 17 close to the breakers 16 over the lifetime of the tire. Apart from the magnets 12, 17 themselves, the stud 20 is made of non-magnetic material in order to be magnetically transparent: for instance, aluminum or a polymer that supports high temperatures (like PEEK) could be used. The radially outer side of the saturation magnet 17 must be located radially inward from the level of the tire tread indicator 22 in order to not be affected by the wear of the tire tread.

The saturating magnet 17 is preferably made of rare earth material in order to strongly saturate the breakers 16. Since a rare earth magnet (e.g. neodymium magnet) could be brittle, the non-magnetic stud material that houses the saturating magnet should be large enough to protect it against mechanical stress. Additionally, or alternatively, the saturating magnet 17 could be of plastic- or elastomer-bonded type (magnetic powder mixed with polymer or rubber-like material) in order to be protected against corrosion and to provide robustness against mechanical shocks.

If the magnetic moment of the saturation magnet 17 is parallel to the breakers (for auto-diagnostic function), the use of a 2-axis magnetometer requires a precise and fix orientation of the saturation magnet parallel to the diagnostic axis of the magnetometer over the lifetime of the tire. This requires a rotationally non-invariant form of the stud 20 that prevents rotation of the stud relative to the tire. For instance, a locking pin 24 (FIG. 7a) or a polygonal shape 26 (FIG. 7b) of (part of) the stud 20 may be considered in order to guarantee a fix orientation of the stud 20 in the tire tread.

On the opposite, radially outer, side of the stud, the tread magnet 12 extends across the entire tread depth, from the surface of the tire tread (at least) down to the level of the tread wear indicator 22 of the tire. Preferably, the stud stem is thin around the tread magnet 12, in order not to locally alter the wear of the tread. The tread magnet preferably comprises or consists of a plastic- or elastomer-bonded magnet having mechanical properties close to those of the tread rubber compound in which the stud is embedded. This guarantees that the tread magnet 12 wears down in the same way as the tread 13.

Figure 8:
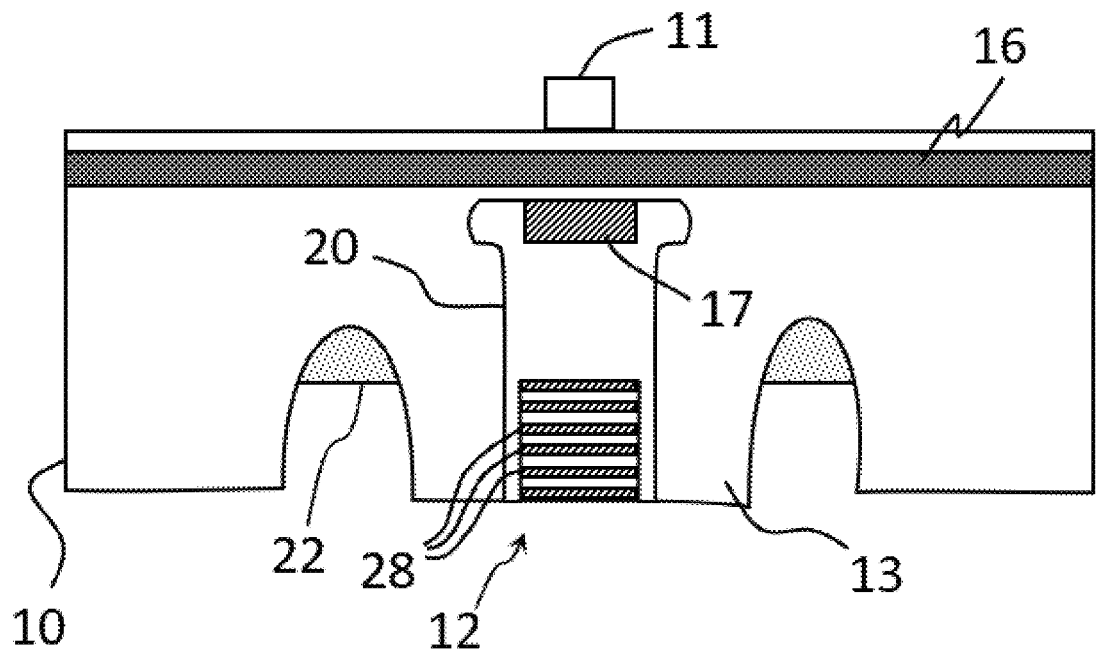
FIG. 8 is a partial cross-sectional schematic view of a vehicle tire equipped with a magnetic stud, wherein the sacrificial magnet portion comprises plural discrete magnets.
Figure 9:
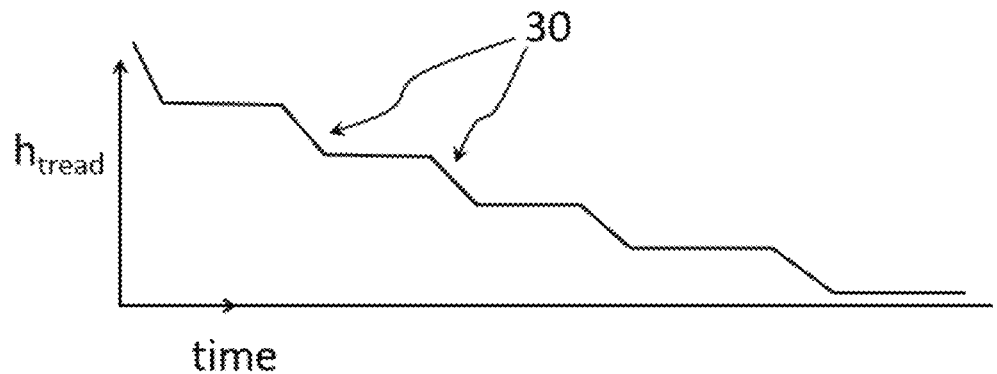
FIG. 9 is a simplified illustration of the evolution of the useful magnetic field signal over time, when the sacrificial magnet portion comprises plural discrete magnets that become eroded at distinct times.
Figure 10:
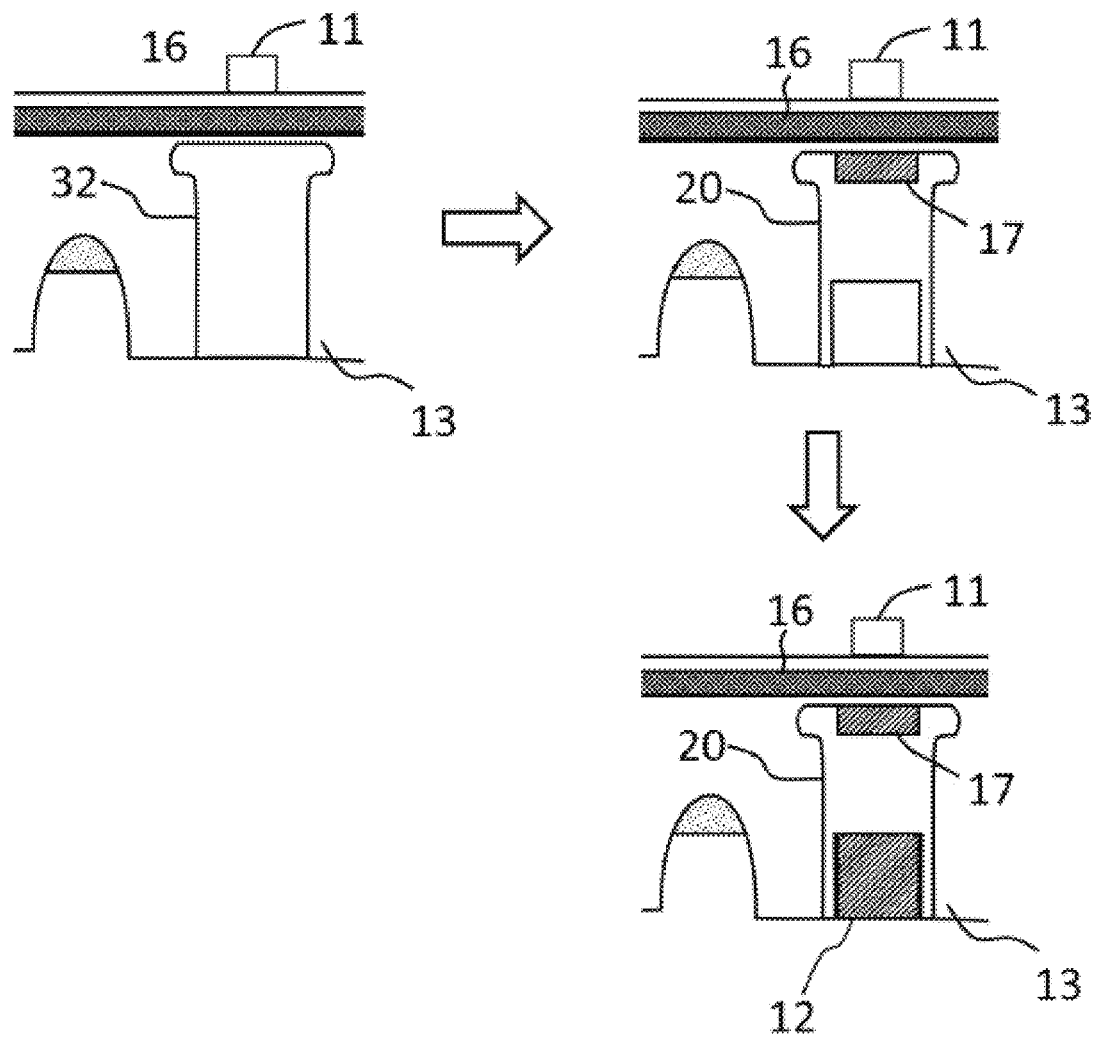
FIG. 10 is a simplified illustration of the installation process of a magnetic stud into a tire.

According to an embodiment, illustrated in FIG. 8, the tread magnet 12 comprises a stack of multiple thin individual magnets 28. The gaps between the individual magnets 28 may be filled with non-magnetic tread compound material. With this tread magnet configuration, the magnetic field strength of the tread magnet 12 decreases stepwise (FIG. 9) when an individual magnet wears away. The advantage of such configuration is to identify multiple discrete wear states. In the magnetic field signal sensed by the magnetometer, clear transitions 30 or steps appear, the counting of which allows identifying precisely to which depth the tread has been eroded. The configuration with multiple individual magnetic inserts 28 may thus simplify both signal processing and calibration of the system.

The tread wear measurement system is preferably installed in the tire after curing. Calibration of the system can be effected on a per tire-type basis if production tolerances affecting the system's response curve of the system (e.g. the magnetometer's response curve, magnetic dipole moments, positioning of the magnets and the magnetometer, etc.) can be kept satisfactorily low. When necessary, calibration can also be carried out tire per tire. The following installation and calibration sequence can be easily automatized for installing the system in a tire. The tire is supposed to be already equipped with a cavity 32 wherein the magnetic stud will be installed. The magnetometer 11 is placed in the tire interior, on the inner liner, aligned with the cavity 32.

If the polarity direction of the saturation magnet is perpendicular to the stud axis (for auto-diagnostic), before installation of the stud 20, the perpendicular component $h_{sat}0$ is measured. When a 3-axis magnetometer is used, the value $h_{sat}0$ is computed as:

$$h_{sat}0 = \sqrt{h_1^2 + h_2^2},$$

where $h_1$ and $h_2$ are the components of the magnetic field at the magnetometer in the directions tangential to the breaker 16. When a 2-axis magnetometer is used, one sensing direction of the magnetometer has to be oriented on the axis of the stud, the other sensing direction must be parallel to the magnetic moment of the saturating magnet and $h_{sat}0$ is simply measured in this direction.

In a second step, the stud 20 only equipped with the saturating magnet 17 is then inserted into the cavity 32. In this situation, the magnetic field sensed by the magnetometer 11 is the same as if the tread magnet had been entirely worn down and the corresponding magnetic field signal measured by the magnetometer 11 can be taken as a reference value, hereinafter denoted as $h_{tread}0$.

Again, if the saturating magnet has a dipole moment perpendicular to the tread magnet, an initial value of the perpendicular magnetic field (denoted $h_{sat}1$) can be obtained in the same way as $h_{sat}0$, at the same stage as $h_{tread}0$.

In a third step, the tread magnet is fixed (e.g. glued) into the stud 16 and an initial value, hereinafter denoted as $h_{tread}1$, is then recorded with the magnetometer.

The tread depth can be obtained by measuring the magnetic field signal on the axis of the tread magnet ($h_{tread}$), computing the relative normalized variation $$\frac{h_{tread} - h_{tread}0}{h_{tread}1 - h_{tread}0}$$

and deriving therefrom the remaining tread depth, the worn-away tread height, the remaining mileage, etc. The step of deriving remaining tread depth, etc., could include calculation, rule-based processing and or using one or more look-up tables.

If the auto-diagnostic function is used, a threshold value may be set somewhere between $h_{sat}0$ and $h_{sat}1$, e.g., to $(h_{sat}0 + h_{sat}1)/2$. If the currently measured $h_{sat}$ (obtained in the same way as $h_{sat}0$ and $h_{sat}1$) is below this threshold, the stud may be presumed to have been ejected from the tire, which will trigger an alarm. The monitoring of $h_{sat}$ can further be used for temperature compensation. It should be noted that a different threshold could be used as well.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:
1. A tire, comprising:
    a tread, the tread having arranged therein a sacrificial magnet portion exposed to tread wear, the sacrificial magnet portion generating a useful magnetic field signal varying as a function of tread wear,
    magnetizable material having a magnetization depending non-linearly on magnetic field strength, the magnetizable material generating an interfering magnetic field signal superimposing the useful magnetic field signal;

a magnetic field sensor disposed in an interior of the tire, the magnetic field sensor for measuring the useful magnetic field signal and the superimposed interfering magnetic field signal;

a permanent magnet portion arranged proximate the magnetizable material so as to decouple the interfering magnetic field signal sensed by the magnetic field sensor from the useful magnetic field signal sensed by the magnetic field sensor by substantially saturating the magnetizable material, wherein the sacrificial magnet portion and the permanent magnet portion are integrated within a stud embedded in the tread; and wherein the sacrificial magnet portion includes a magnetic moment, wherein the permanent magnet portion includes a magnetic moment, and wherein the magnetic moment of the sacrificial magnet portion and the magnetic moment of the permanent magnet portion are collinear.

2. The tire as claimed in claim 1 wherein the tread comprises a recess shaped complementarily to the stud so as to secure the stud in position and relative orientation.

3. The tire as claimed in claim 1 wherein the sacrificial magnet portion comprises a plug with magnetic particles dispersed therein.

4. The tire as claimed in claim 1 wherein the sacrificial magnet portion comprises plural discrete magnetic inserts arranged radially aligned at different depths in the tread.

5. The tire as claimed in claim 1 including a breaker or a belt, the magnetizable material being part of the breaker or the belt.

6. The tire as claimed in claim 1 including a controller operatively connected to the magnetic field sensor, the controller configured to receive the useful magnetic field signal and to derive from the useful magnetic field signal an indicator of at least one of tread profile depth, tread wear and estimated remaining tread lifetime.

7. The tire as claimed in claim 1 wherein the sacrificial magnet portion, the permanent magnet portion, and the magnetic field sensor are radially aligned.

8. The tire as claimed in claim 1 wherein the magnetic field sensor includes at least one of a single-axis Hall sensor, a multi-axis Hall sensor, a magnetoresistive-effect-based magnetometer, a magnetostrictive-effect-based magnetometer and a Lorentz-force-based MEMS magnetometer.

9. The tire as claimed in claim 1 wherein the magnetic field sensor comprises a three-axis magnetometer.

10. A tire, comprising:

a tread, the tread having arranged therein a sacrificial magnet portion exposed to tread wear, the sacrificial magnet portion generating a useful magnetic field signal varying as a function of tread wear, magnetizable material having a magnetization depending non-linearly on magnetic field strength, the magnetizable material generating an interfering magnetic field signal superimposing the useful magnetic field signal;

a magnetic field sensor disposed in an interior of the tire, the magnetic field sensor for measuring the useful magnetic field signal and the superimposed interfering magnetic field signal;

a permanent magnet portion arranged proximate the magnetizable material so as to decouple the interfering magnetic field signal sensed by the magnetic field sensor from the useful magnetic field signal sensed by the magnetic field sensor by substantially saturating the magnetizable material, wherein the sacrificial magnet portion and the permanent magnet portion are integrated within a stud embedded in the tread; and wherein the sacrificial magnet portion includes a magnetic moment, wherein the permanent magnet portion includes a magnetic moment, and wherein the magnetic moment of the sacrificial magnet portion and the magnetic moment of the permanent magnet portion are perpendicular.

11. The tire as claimed in claim 10 wherein the tread comprises a recess shaped complementarily to the stud so as to secure the stud in position and relative orientation.

12. The tire as claimed in claim 10 wherein the sacrificial magnet portion comprises a plug with magnetic particles dispersed therein.

13. The tire as claimed in claim 10 wherein the sacrificial magnet portion comprises plural discrete magnetic inserts arranged radially aligned at different depths in the tread.

14. The tire as claimed in claim 10 including a breaker or a belt, the magnetizable material being part of the breaker or the belt.

15. The tire as claimed in claim 10 including a controller operatively connected to the magnetic field sensor, the controller configured to receive the useful magnetic field signal and to derive from the useful magnetic field signal an indicator of at least one of tread profile depth, tread wear and estimated remaining tread lifetime.

16. The tire as claimed in claim 10 wherein the sacrificial magnet portion, the permanent magnet portion, and the magnetic field sensor are radially aligned.

17. The tire as claimed in claim 10 wherein the magnetic field sensor includes at least one of a single-axis Hall sensor, a multi-axis Hall sensor, a magnetoresistive-effect-based magnetometer, a magnetostrictive-effect-based magnetometer and a Lorentz-force-based MEMS magnetometer.

18. The tire as claimed in claim 10 wherein the magnetic field sensor comprises a three-axis magnetometer.

* * * * *